United States Patent [19]

Teraoka et al.

[11] Patent Number: 4,782,237

[45] Date of Patent: Nov. 1, 1988

[54] RADIATION IMAGE STORAGE PANEL

[75] Inventors: Masanori Teraoka; Takayuki Kuriyama, both of Kaisei, Japan

[73] Assignee: Fuji Photo Film Co., Ltd., Japan

[21] Appl. No.: 24,924

[22] Filed: Mar. 12, 1987

Related U.S. Application Data

[63] Continuation of Ser. No. 575,264, Jan. 30, 1984, abandoned.

[30] Foreign Application Priority Data

Jan. 31, 1983 [JP] Japan ................................ 58-14188

[51] Int. Cl.⁴ ................................................ G01J 1/58

[52] U.S. Cl. ................................ 250/486.1; 250/484.1

[58] Field of Search ............... 250/327.2, 486.1, 483.1, 250/484.1

[56] References Cited

U.S. PATENT DOCUMENTS

| | | | |
|---|---|---|---|
| 4,039,840 | 8/1977 | Shimiya et al. | 250/486.1 |
| 4,239,968 | 12/1980 | Kotera et al. | 250/327.2 |
| 4,472,635 | 9/1984 | Yobota et al. | 250/486.1 |

*Primary Examiner*—Janice A. Howell
*Assistant Examiner*—Richard Hanig
*Attorney, Agent, or Firm*—Gerald J. Ferguson, Jr.

[57] ABSTRACT

A radiation image storage panel comprising a support and a phosphor layer provided thereon which comprises a binder and a stimulable phosphor dispersed therein, characterized in that said stimulable phosphor has a particle size distribution showing two or more peaks.

3 Claims, 2 Drawing Sheets

RADIATION IMAGE STORAGE PANEL

This application is a continuation of Ser. No. 575,264, filed Jan. 30, 1984, now abandoned.

BACKGROUND OF THE INVENTION

Field of the Invention

This invention relates to a radiation image storage panel and more particularly, to a radiation image storage panel comprising a support and a phosphor layer provided thereon which comprises a binder and a stimulable phosphor dispersed therein.

Description of Prior Arts

For obtaining a radiation image, there has been conventionally employed a radiography utilizing a combination of a radiographic film having an emulsion layer containing a photosensitive silver salt material and a radiographic intensifying screen.

As a method replacing the above-described radiography, a radiation image recording and reproducing method utilizing a stimulable phosphor as described, for example, in U.S. Pat. No. 4,239,968, has been recently paid much attention. In the radiation image recording and reproducing method, a radiation image storage panel comprising a stimulable phosphor (stimulable phosphor sheet) is employed, and the method involves steps of causing the stimulable phosphor of the panel to absorb radiation energy having passed through an object or having radiated from an object; exciting the stimulable phosphor with an electromagnetic wave such as visible light and infrared rays (hereinafter referred to as "stimulating rays") to sequentially release the radiation energy stored in the stimulable phosphor as light emission (stimulated emission); photoelectrically converting the emitted light to give electric signals; and reproducing the electric signals as a visible image on a recording material such as a photosensitive film or on a displaying device such as CRT.

In the above-described radiation image recording and reproducing method, a radiation image can be obtained with a sufficient amount of information by applying a radiation to the object at considerably smaller dose, as compared with the case of using the conventional radiography. Accordingly, this radiation image recording and reproducing method is of great value especially when the method is used for medical diagnosis.

The radiation image storage panel employed in the above-described radiation image recording and reproducing method has a basic structure comprising a support and a phosphor layer provided on one surface of the support. Further, a transparent film is generally provided on the free surface (surface not facing the support) of the phosphor layer to keep the phosphor layer from chemical deterioration or physical shock.

The phosphor layer comprises a binder and stimulable phosphor particles dispersed therein. The stimulable phosphor emits light (stimulated emission) when excited with stimulating rays after having been exposed to a radiation such as X-rays. Accordingly, the radiation having passed through an object or having radiation from an object is absorbed by the phosphor layer of the radiation image storage panel in proportion to the applied radiation dose, and a radiation image of the object is produced in the radiation image storage panel in the form of a radiation energy-stored image (latent image). The radiation energy-stored image can be released as stimulated emission (light emission) by applying stimulating rays to the panel, for instance, by scanning the panel with stimulating rays. The stimulated emission is then photoelectrically converted to electric signals, so as to produce a visible image from the radiation energy-stored image.

It is desired for the radiation image storage panel employed in the radiation image recording and reproducing method to have a high sensitivity and to provide an image of high quality (high sharpness, high graininess, etc.).

In the art of enhancing the above-described quality of image, particularly sharpness, a variety of radiation image storage panels have been developed, for instance, a radiation image storage panel having a phosphor layer of reduced thickness and a radiation image storage panel a part of which is colored. However, these radiation image storage panels have a tendency to cause deterioration of the graininess of images provided thereby. Accordingly, a radiation image storage panel capable of giving an image improved in the graininess as well as the sharpness is desired.

As a method of enhancing both the sharpness and graininess in the radiation image storage panel, adjustment of particle size of a stimulable phosphor employed in the panel has been proposed. More in detail, the enhancement in both the sharpness and graininess of the image can be obtained by employing a stimulable phosphor having small particle size for formation of the phosphor layer of the panel.

Concerning the above-described method, the present applicant has already applied for patent an invention on a radiation image storage panel characterized in that a stimulable phosphor employed in a phosphor layer of the panel has such a particle size distribution that phosphor particles having a size (diameter) of not less than 100 μm are present in an amount of not more than 1% by weight and phosphor particles having a size of not less than 1 μm are present in an amount of not less than 50% by weight (Japanese Patent Application No. 57(1982)-65609, corresponding to U.S. Pat. No. 4,547,672 and European Patent Publication No. 83103790.8).

However, it is not easy to adjust the particle size of a stimulable phosphor employed in the phosphor layer of the panel to be included within a certain range so as to give the disired sharpness and graininess of an image provided by the panel. This is because the particle size of the stimulable phosphor easily varies depending upon the conditions of preparation thereof, so that it is difficult to adjust the particle size of the phosphor to a desired level in the stage of the preparation. Otherwise, it is also difficult to so adjust the particle size of the resultant stimulable phosphor by means of classification and the like as to give the desired quality of the image provided by the panel. In addition, this is accompanied by complicated procedures and decrease of phosphor yield.

SUMMARY OF THE INVENTION

Accordingly, it is an object of the present invention to provide a radiation image storage panel providing an image improved in the image quality, especially in the sharpness and the graininess.

The above-mentioned object can be accomplished by a radiation image storage panel of the present invention comprising a support and a phosphor layer provided thereon which comprises a binder and a stimulable phosphor dispersed therein, characterised in that said stimulable phosphor has a particle size distribution showing at least two peaks.

In the present invention, the term "peak" of particle size distribution of stimulable phosphor means to include a virtual or hidden peak which appears as "shoulder" in a graph showing a particle size distribution. The term "mean particle size of (stimulable ) phosphor" means a mean particle size based on a weight average thereof.

BRIEF DESCRIPTION OF THE DRAWINGS

In FIG. 1, each of Curves (2) to (5) is a distribution curve of particle size of the stimulable phosphor employed in the panel according to the present invention; and each of Curves (1) and (6) is a distribution curve of particle size of the stimulable phosphor employed in a panel for comparison.

DETAILED DESCRIPTION OF THE INVENTION

Figure 1:
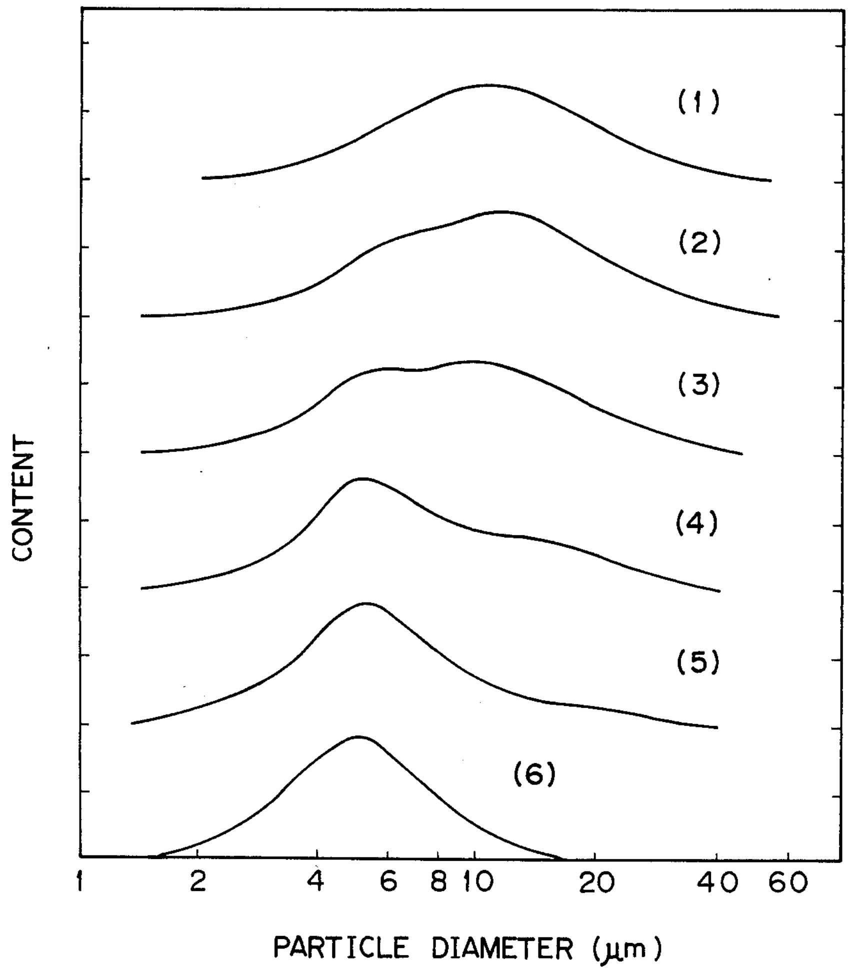
FIG. 1 graphically illustrates a variety of particle size (diameter) distributions of stimulable phosphors employed in the radiation image storage panels.
Figure 2:
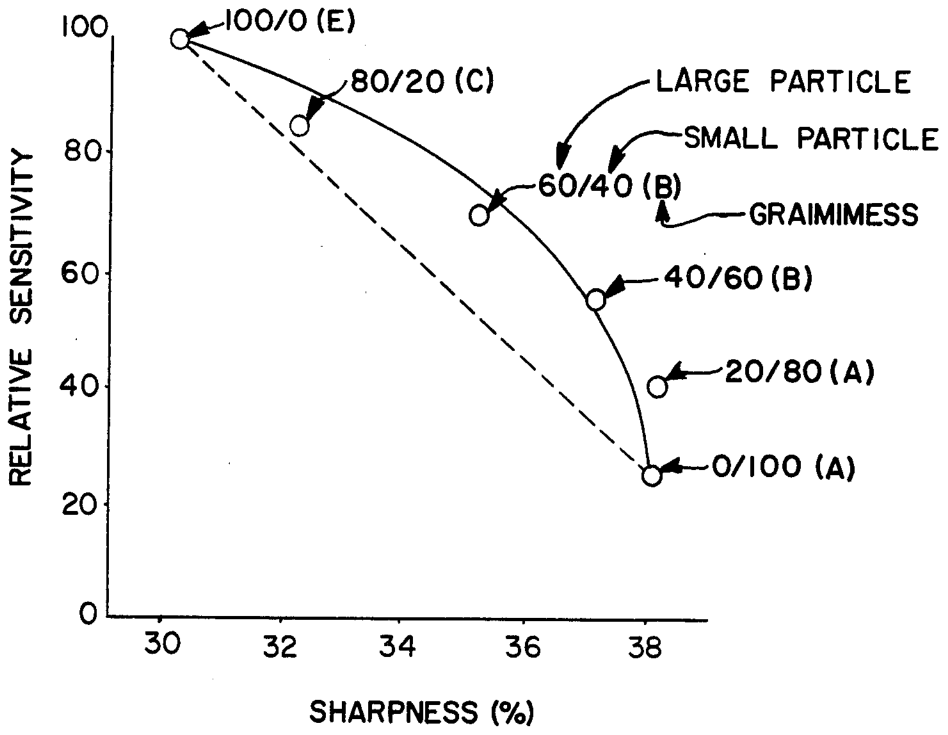
FIG. 2 is a graph prepared based on the results of Table II at page 17 of the specification. This graph shows that a mixture of a large phosphor and a small phosphor generally gives an improved phosphor composition from the view points of total balance of sharpness, graininess, and sensitivity. The graph also shows that a mixture of an extremely great amount of a large phosphor and an extremely small amount of a small phosphor (near to 100/0) is practically unfavorable because the graininess is very poor.

The present invention provides the enhancement in the quality of image, namely, both the sharpness and graininess of the image provided by the radiation image storage panel, by the employment of a stimulable phosphor having the particle size distribution showing at least two peaks.

In other words, both the sharpness and graininess can be enhanced at the same time, by incorporating a stimulable phosphor having a relatively small particle size in combination with another stimulable phosphor having a larger particle size into the phosphor layer of the radiation image storage panel.

The above-described particle size distribution of the stimulable phosphor can be easily brought about by mixing at least two kinds of phosphors having a mean particle size different from each other. This means that all the particles of stimulable phosphor employed in the panel are not necessarily adjusted to a definite size for attaining the desired sharpness and graininess. That is, it is unnecessary to so arrange the size of all phosphor particles as to have a small size. Accordingly, the employment of two or more kinds of stimulable phosphors which respectively have an appropriately different mean particle size can give a radiation image storage panel enhanced in both the sharpness and graininess of the image provided thereby.

Further, by varying the mixing ratio of the stimulable phosphors, the resulting radiation image storage panel can provide an image improved in the sharpness and graininess to a desired level.

In general, the sensitivity of a radiation image storage panel decreases as the particle size of a stimulable phosphor employed therein becomes small. In the present invention, it is impossible to provide a radiation image storage panel providing an image of high quality without decreasing the sensitivity to such a low level by appropriately varying the mean particle sizes of the stimulable phosphors to be mixed or the mixing ratio therebetween. In other words, by employing in a radiation image storage panel a mixture of stimulable phosphors having a mean particle size different from each other, the enhancement in the sensitivity caused by the phosphor particles having the relatively large particle size as well as the enhancement in the quality of the image caused by the phosphor particles having the relatively small particle size can be effectively accomplished.

The radiation image storage panel of the present invention having the above-described advantageous characteristics can be prepared, for instance, in the following manner.

The support material employed in the present invention can be selected from those employed in the conventional radiogaphic intensifying screens or those employed in the known radiation image storage panels. Examples of the support material include plastic films such as films of cellulose acetate, polyester, polyethylene terephthalate, polyamide, polyimide, triacetate and polycarbonate; metal sheets such as aluminum foil and aluminum alloy foil; ordinary papers; baryta paper; resin-coated papers; pigment papers containing titanium dioxide or the like; and papers sized with polyvinyl alcohol or the like. From a viewpoint of characteristics of a radiation image storage panel as an information recording material, a plastic film is preferably employed as the support material of the invention. The plastic film may contain a light-absorbing material such as carbon black, or may contain a light-reflecting material such as titanium dioxide. The former is appropriate for preparing a highsharpness type radiation image storage panel, while the latter is appropriate for preparing a high-sensitivity type radiation image storage panel.

In the preparation of a known radiation image storage panel, one or more additional layers are occasionally provided between the support and the phosphor layer so as to enhance the adhesion between the support and the phosphor layer, or to improve the sensitivity of the panel or the quality of an image provided thereby. For instance, a subbing layer or an adhesive layer may be provided by coating polymer material such as gelatin over the surface of the support on the phosphor layer side. Otherwise, a light-reflecting layer or a light-absorbing layer may be provided by forming a polymer material layer containing a light-reflecting material such as titanium dioxide or a light-absorbing material such as carbon black. In the invention, one or more of these additional layers may be provided depending on the type of the radiation image storage panel to be obtained.

As described in Japanese Patent Application No. 57(1982)-82431 (corresponding to U.S. patent application Ser. No. 496,278 and European Patent Publication No. 92241), the phosphor layer side surface of the support (or the surface of an adhesive layer, light-reflecting layer, or light-absorbing layer in the case where such layers provided on the phosphor layer) may be provided with protruded and depressed portions for enhancement of the sharpness of radiographic image.

On the support a phosphor layer is provided. The phosphor layer comprises a binder and stimulable phosphor particles dispersed therein.

The stimulable phosphor, as described hereinbefore, gives stimulated emission when excited with stimulating rays after exposure to a radiation. In the viewpoint of practical use, the stimulable phosphor is desired to give stimulated emission in the wavelength region of 300–500 nm when excited with stimulating rays in the wavelength region of 400–850 nm.

Examples of the stimulable phosphor employable in the radiation image storage panel of the present invention include:

SrS:Ce,Sm, SrS:Eu,Sm, $ThO_2$:Er, and $La_2O_2S$:Eu,Sm, as described in U.S. Pat. No. 3,859,527;

ZnS:Cu,Pb, BaO·$xAl_2O_3$:Eu, in which x is a num satisfying the condition of $0.8 \leqq x \leqq 10$, and $M^{2+}O \cdot xSiO_2$:A, in which $M^{2+}$ is at least one divalent metal selected from the group consisting of Mg, Ca, Sr, Zn, Cd and Ba, A is at least one element selected from the group consisting of Ce, Tb, Eu, Tm, Pb, Tl, Bi and Mn, and x is a number satisfying the condition of $0.5 \leqq x \leqq 2.5$, as described in U.S. Pat. No. 4,326,078;

$(Ba_{1-x-y},Mg_x,Ca_y)FX:aEu^{2+}$, in which X is at least one element selected from the group consisting of Cl and Br, x and y are numbers satisfying the conditions of $0 < x+y \leqq 0.6$, and $xy=0$, and a is a number satisfying the condition of $10^{-6} \leqq a \leqq 5 \times 10^{-2}$, as described in Japanese Patent Provisional Publication No. 55(1980)-12143;

LnOX:xA, in which Ln is at least one element selected from the group consisting of La, Y, Gd and Lu, X is at least one element selected from the group consisting of Cl and Br, A is at least one element selected from the group consisting of Ce and Tb, and x is a number satisfying the condition of $0 < x < 0.1$, as described in the above-mentioned U.S. Pat. No. 4,236,078;

$(Ba_{1-x}, M^{II}_x)FX:yA$, in which $M^{II}$ is at least one divalent metal selected from the group consisting of Mg, Ca, Sr, Zn and Cd, X is at least one element selected from the group consisting of Cl, Br and I, A is at least one element selected from the group consisting of Eu, Tb, Ce, Tm, Dy, Pr, Ho, Nd, Yb and Er, and x and y are numbers satisfying the conditions of $0 \leqq x \leqq 0.6$ and $0 \leqq y \leqq 0.2$, respectively, as described in Japanese Patent Provisional Publication No. 55(1980)-12145;

The above-described stimulable phosphors are given by no means to restrict the stimulable phosphor employable in the present invention. Any other phosphors can be also employed, provided that the phosphor gives stimulated emission when excited with stimulating rays after exposure to a radiation.

However, as for the particle size of the stimulable phosphor, that is a characteristic requisite for the present invention, it is required that the stimulable phosphor has such a particle size distribution as to show at least two peaks. Preferably, a space (or distance) between the two peaks positioned farthest from each other in the distribution showing at least two peaks is not less than 2 μm in terms of particle diameter. More preferably, the two peaks at both ends reside in the regions of 1–8 μm and 4–30 μm, in terms of particle diameter, respectively.

The above-described particle size distribution of the stimulable phosphor can be usually attained by mixing several kinds of stimulable phosphors having a mean particle size different from each other, since a stimulable phosphor prepared according to the conventional manner shows a substantially regular distribution with respect to the particle size (particle diameter), and the mean particle size of the prepared phosphor corresponds to the particle size locating at the peak of the regular distribution thereof. That is, in the case that two or more kinds of stimulable phosphors having a different mean particle size are mixed therebetween, there can be obtained a mixture of the stimulable phosphors having a particle size distribution showing plural peaks in which the peak positions correspond to the peak positions (indicating the mean particle size) of the respective phosphors. In other words, the particle size distribution of stimulable phosphor of the present invention can be hardly obtained by employing only one kind of stimulable phosphor prepared according to the conventional manner.

However, the stimulable phosphor employable in the present invention is not restricted to a mixture of two or more kinds of stimulable phosphors which have different mean particle sizes, respectively.

Further, even in the case of only two peaks appearing in the above-described particle size distribution of the stimulable phosphor, the aimed enhancement in the sharpness and graininess can be sufficiently accomplished.

When the stimulable phosphor having the above-described particle size distribution showing only two peaks is brought about by mixing two kinds of stimulable phosphors having a mean particle size different from each other, the mixing ratio between the stimulable phosphor having a smaller means particle size and the stimulable phosphor having a larger mean particle size generally is in the range of from 20:80 to 90:10, by weight. The two kinds of stimulable phosphors preferably have a mean particle size in the range of 1–8 μm and 4–30 μm, respectively.

Examples of the binder to be contained in the phosphor layer include: natural polymers such as proteins (e.g. gelatin), polysaccharides (e.g. dextran) and gum arabic; and synthetic polymers such as polyvinyl butyral, polyvinyl acetate, nitrocellulose, ethylcellulose, vinylidene chloride-vinyl chloride copolymer, polymethyl methacrylate, vinyl chloride-vinyl acetate copoymer, polyurethane, cellulose acetate butyrate, polyvinyl alcohol, and linear polyester. Particularly preferred are nitrocellulose, linear polyester, and a mixture of nitrocellulose and linear polyester.

The phosphor layer can be formed on the support, for instance, by the following procedure.

In the first place, phosphor particles and a binder are added to an appropriate solvent, and then they are mixed to prepare a dispersion of the phosphor particles in the binder solution.

Examples of the solvent employable in the preparation of the coating dispersion include lower alcohols such as methanol, ethanol, n-propanol and n-butanol; chlorinated hydrocarbons such as methylene chloride and ethylene chloride; ketones such as acetone, methyl ethyl ketone and methyl isobutyl ketone; esters of lower alcohols with lower aliphatic acids such as methyl acetate, ethyl acetate and butyl acetate; ethers such as dioxane, ethylene glycol monoethylether and ethylene glycol monoethyl ether; and mixtures of the above-mentioned compounds.

The ratio between the binder and the phosphor in the coating dispersion may be determined according to the characteristics of the aimed radiation image storage panel and the nature of the phosphor employed. Generally, the ratio therebetween is within the range of from 1:1 to 1:100 (binder:phosphor, by weight), preferably from 1:8 to 1:40.

The coating dispersion may contain a dispersing agent to assist the dispersibility of the phosphor particles therein, and also contain a variety of additives such as a plasticizer for increasing the bonding between the binder and the phosphor particles in the phosphor layer. Examples of the dispersing agent include phthalic acid, stearic acid, caproic acid and hydrophobic surface active agent. Examples of the plasticizer include phosphates such as triphenyl phosphate, tricresyl phosphate and diphenyl phosphate; phthalates such as diethyl phthalate and dimethoxyethyl phthalate; glycolates such as ethylphthalyl ethyl glycolate and butylphthalyl butyl glycolate; and polyesters of polyethylene glycols with aliphatic dicarboxylic acids such as polyester of triethylene glycol with adipic acid and polyester of diethylene glycol with succinic acid.

The coating dispersion containing the phosphor particles and the binder prepared as described above is applied evenly to the surface of a support to form a layer of the coating dispersion. The coating procedure can be carried out by a conventional method such as a method using a doctor blade, a roll coater or a knife coater.

After applying the coating dispersion to the support, the coating dispersion is then heated slowly to dryness so as to complete the formation of a phosphor layer. The thickness of the phosphor layer varies depending upon the characteristics of the aimed radiation image storage panel, the nature of the phosphor, the ratio between the binder and the phosphor, etc. Generally, the thickness of the phosphor layer is within a range of from 20 μm to 1 mm, preferably from 50 to 500 μm.

The phosphor layer can be provided onto the support by the methods other than that given in the above. For instance, the phosphor layer is initially prepared on a sheet material (false support) such as a glass plate, a metal plate or a plastic sheet using the aforementioned coating dispersion and then thus prepared phosphor layer is superposed on the genuine support by pressing or using an adhesive agent.

The radiation image storage panel generally has a transparent film on a free surface of a phosphor layer to protect the phosphor layer from physical and chemical deterioration. In the radiation image storage panel of the present invention, it is preferable to provide a transparent film for the same purpose.

The transparent film can be provided onto the phosphor layer by coating the surface of the phosphor layer with a solution of a transparent polymer such as a cellulose derivative (e.g. cellulose acetate or nitrocellulose), or a synthetic polymer (e.g. polymethyl methacrylate, polyvinyl butyral, polyvinyl formal, polycarbonate, polyvinyl acetate, or vinyl chloride-vinyl acetate copolymer), and drying the coated solution. Alternatively, the transparent film can be provided onto the phosphor layer by beforehand preparing it from a polymer such as polyethylene terephthalate, polyethylene, polyvinylidene chloride or polyamide, followed by placing and fixing it onto the phosphor layer with an appropriate adhesive agent. The transparent protective film preferably has a thickness within a range of approx. 3 to 20 μm.

The following examples further illustrate the present invention, but these examples are by no means understood to restrict the invention.

EXAMPLE AND COMPARISON EXAMPLE

Two kinds of divalent europium activated barium fluorobromide stimulable phosphors ($BaFBr:Eu^{2+}$), which have mean particle sizes of approx. 5 μm and approx. 11 μm, respectively, the former belonging to a small particle group and the latter to a large particle group, are mixed to obtain mixtures of the stimulable phosphors with various mixing ratios by weight (%) as set forth in Table 1.

TABLE 1

| Phosphor No. | Large Particle (11 μm) | Small Particle (5 μm) |
|---|---|---|
| 1 | 100 | 0 |
| 2 | 80 | 20 |
| 3 | 60 | 40 |
| 4 | 40 | 60 |
| 5 | 20 | 80 |
| 6 | 0 | 100 |

In Table 1, Phosphors No. 1 and No. 6 are phosphors for comparison comprising only the large particles and the small particles, respectively.

The particle size distributions of the above-given Phosphors No. 1 to No. 6 are graphically illustrated in FIG. 1, which respectively correspond to Curves (1) to (6). As shown in Curves (2) to (5), each of Phosphors No. 2 to No. 5 has two peaks (including shoulder) in the respective regions of 4–8 μm and 8–25 μm in the distribution curve of particle size.

By using the above Phosphors No. 1 to No. 6, a variety of radiation image storage panels were prepared.

A binder mixture of a linear polyester and nitrocellulose (nitrification degree: 11.5%) and the abovementioned particulate stimulable phosphor were mixed in a ration of 1:20 (binder:phosphor, by weight). To the mixture were added tricresyl phosphate, n-butanol and methyl ethyl ketone, and the resulting mixture was stirred sufficiently by means of a propeller agitator to prepare a coating dispersion containing homogeneously dispersed phosphor particles and having a viscosity of 25–30 PS (at 25° C.).

The coating dispersion was uniformly applied onto a polyethylene terephthalate sheet containing carbon black (support, thickness; 250 μm) placed horizontally on a glass plate. the coating procedure was carried out using a doctor blade. The support having the applied coating dispersion was then placed in an oven and heated at a temperature gradually rising from 25° to 100° C. Thus, a sheet consisting of a support and a phosphor layer (thickness: approx. 300 μm) was prepared.

On the phosphor layer was placed a transparent polyethylene terephthalate film (thickness: 12 μm; provided with a polyester andhesive layer) to combine the transparent film and the phosphor layer through the adhesive layer.

Thus, radiation image storage panels consisting essentially of a support, a phosphor layer and a transparent protective film were prepared (Panels No. 1 to No. 6).

The radiation image storage panels prepared as described above were evaluated on the sharpness and graininess of the image provided thereby and the sensitivity thereof according to the following test method.

(1) Sharpness of image

The radiation image storage panel was exposed to X-rays at voltage of 80 KVp through an MTF chart and subsequently scanned with a He-Ne laser beam (wavelength: 632.8 nm) to excite the phosphor. The light emitted by the phosphor layer of the panel was detected and converted to the corresponding electric signals by means of a photosensor (a photomultiplier having spectral sensitivity of type S-5). The electric signals were reproduced by an image reproducing apparatus to obtain a visible image on a recording apparatus, and the modulation transfer funtion (MTF) value of the visible image was determined. The MTF value was given as a value (%) at the spacial frequency of 2 cycle/mm.

(2) Graininess of image

The radiation image storage panel was exposed to X-rays at voltage of 80 KVp and subsequently scanned with a He-Ne laser beam (wavelength: 632.8 nm) to excite the phosphor. The light emitted by the phosphor layer of the panel was detected and converted to the corresponding electric signals by means of the above-mentioned photosensor. The electric signals were reproduced and recorded on an ordinary photographic film by means of a film scanner. The visible image recorded on the film was observed with eyes to evaluate the graininess. The results of the evaluation were marked by the following five levels of A, B, C, D and E.

A: The graininess was prominently excellent.

B: The graininess was satisfactory.

C: The graininess was acceptable in practical use.

D: The graininess was poor.

E: The graininess was poorer than D.

(3) Sensitivity

The radiation image storage panel was exposed to X-rays at voltage of 80 KVp and subsequently scanned with a He-Ne laser beam (wavelength: 632.8 nm) to excite the phosphor. The light emitted by the phosphor layer of the panel was detected and converted to the corresponding electric signals by means of the above-mentioned photosensor. The sensitivity of the panel was determined from the level of the electric signals.

The results of the evaluation on the radiation image storage panels are set forth in Table 2.

TABLE 2

| Panel No. | Large Particle/ Small Particle (wt. %) | Sharpness (%) | Graininess | Relative Sensitivity |
|---|---|---|---|---|
| 1 | 100/0 | 30 | E | 100 |
| 2 | 80/20 | 32 | C | 85 |

TABLE 2-continued

| Panel No. | Large Particle/ Small Particle (wt. %) | Sharpness (%) | Graininess | Relative Sensitivity |
|---|---|---|---|---|
| 3 | 60/40 | 35 | B | 70 |
| 4 | 40/60 | 37 | B | 55 |
| 5 | 20/80 | 38 | A | 40 |
| 6 | 0/100 | 38 | A | 25 |

What is claimed is:

1. In a radiation image storage panel comprising a support and a phosphor layer provided thereon which comprises a binder and a stimulable phosphor disbursed therein for the use in a radiation image recording and reproducing method involving steps of causing the stimulable phosphor of the panel to absorb radiation energy having passed through an object or having radiated from an object; exciting the stimulable phosphor with an electromagnetic wave to sequentially release the radiation energy stored in the stimulable phosphor as light emission, photoelectrically converting the emitted light to give electric signals; and reproducing the electric signals as visible image;

the improvement comprising said stimulable phosphor having a particle size distribution showing at least two peaks in which a space between two peaks at both ends in said particle size distribution is not less than 2 μm, said stimulable phosphor having been prepared by mixing a stimulable phosphor having a small mean size in the range of 1–8 μm and a stimulable phosphor having a large mean size in the range of 4–30 μm, both stimulable phosphors having the same nature, having a mixing ratio by weight of the stimulable phosphor having a small mean size to the stimulable phosphor having a large mean size being in the range of from 20/80 to 90/10.

2. The radiation image storage panel as claimed in claim 2, wherein the phosphor layer has a thickness in the range of 50 to 500 μm.

3. The radiation image storage panel as claimed in claim 1, wherein the phosphor layer has a thickness in europium activated alkaline earth metal fluorohalide phosphor.

* * * * *